United States Patent [19]

Tanaka

[11] Patent Number: 5,070,923

[45] Date of Patent: Dec. 10, 1991

[54] ANTISKID APPARATUS HAVING DOGLEGGED LINKAGES PIVOTALLY CONNECTED

[76] Inventor: Toshiharu Tanaka, 7-17, Suzurandaihigashi-machi 8-chome, Kita,ku, Kobe050705672, Japan

[21] Appl. No.: 535,904

[22] Filed: Jun. 11, 1990

[30] Foreign Application Priority Data

Jun. 19, 1989 [JP] Japan .................. 1-157262

[51] Int. Cl.$^5$ .................. B60C 27/20; B60C 27/02
[52] U.S. Cl. .................. 152/226; 152/216; 152/218
[58] Field of Search ........... 152/208, 213 R, 213 A, 152/214, 216, 217, 218, 219, 220, 225 R, 225 C, 226, 227, 233, 241; 301/40 R, 41 R, 44 T, 44 B, 46, 49

[56] References Cited

U.S. PATENT DOCUMENTS

| 3,053,302 | 9/1962 | Bopst | 152/226 |
| 3,437,121 | 4/1969 | Strapko et al. | 152/213 R |

FOREIGN PATENT DOCUMENTS

| 0056130 | 7/1982 | European Pat. Off. . |
| 0263433 | 4/1988 | European Pat. Off. . |
| 2026713 | 12/1971 | Fed. Rep. of Germany . |
| 2636375 | 2/1977 | Fed. Rep. of Germany . |
| 2710323 | 9/1978 | Fed. Rep. of Germany | 152/208 |
| 3124826 | 2/1983 | Fed. Rep. of Germany | 152/218 |
| 58-23241 | 5/1983 | Japan . |
| 63-71401 | 3/1988 | Japan . |

Primary Examiner—Michael W. Ball
Assistant Examiner—Gregory J. Wilber
Attorney, Agent, or Firm—Marshall, O'Toole, Gerstein, Murray & Bicknell

[57] ABSTRACT

Antiskid apparatus comprising a first doglegged linkage of two rods which are pivotally connected together on one end and a second doglegged linkage of two rods which are pivotally connected together on one end, the linkages being pivotally connected in the middle of the respective rods to form a pantograph. A circular support member is pivotally mounted on the open end of each of the rods, and a thin-plate-shaped gripping member is fixed to each of the support members. Each of the gripping members comprises a ground contact portion that contacts the tire tread and covers at least a part of the width of the tread and a mounting portion that contacts the tire sidewall. In one embodiment, the linkage is held in a specified form by means of a holder, and the apparatus is mounted on the tire by securing hooks of tighteners in positions corresponding to the tire wheel holes, the hooks being provided at the top of the tighteners.

4 Claims, 8 Drawing Sheets

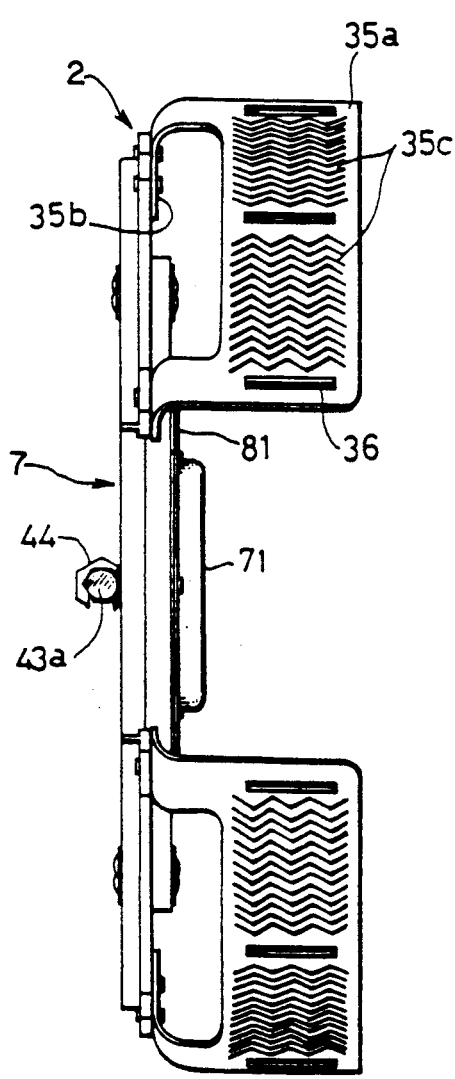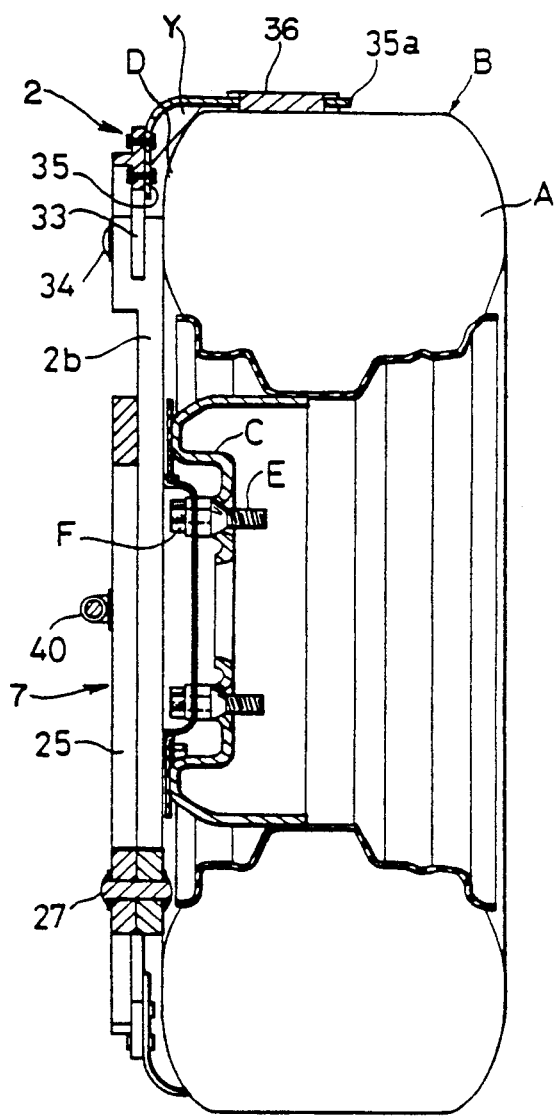

ANTISKID APPARATUS HAVING DOGLEGGED LINKAGES PIVOTALLY CONNECTED

FIELD AND BACKGROUND OF THE INVENTION

This invention relates to a tire antiskid apparatus that is used when operating a vehicle on a snow-covered road or icy road, and in practical applications, such apparatus is mounted on each of the driving wheels of the vehicle.

In the past, tire chains have been generally used as a tire antiskid apparatus, and tire chains have a fairly high antiskid effect. Fitting and removal of tire chains, however, require much time and skill, and are difficult jobs when snow covers the ground. As a result, people tend to avoid the use of tire chains.

In recent years, various antiskid apparatuses that allow easier mounting and removal from the tire have been proposed to replace tire chains. Such apparatus include that described in the Japanese Patent Publication No. SHO-58-23241 and one described in the Japanese Provisional Patent Publication No. SHO-63-71401. The former patent shows an apparatus developed by the present inventor, and has a construction wherein a U-shaped fitting which covers the full width of the tire tread is pivotally mounted on each of the free ends of a pantograph or linkage, and a tightener is provided for tightening the linkage between pivotal joints thereof. The latter patent shows apparatus comprising a fixed disc designed to be fixed onto a tire wheel and a support disc having fitting pieces bent to lie along the tire tread, the fitting pieces being mounted on the top end of each antiskid arm and radially extending from the support disc, and the support disc being arranged to be held on the fixed disc by means of a ferrule.

Of the antiskid apparatuses described in the aforementioned two publications, in the case of the former, the antiskid apparatus (in particular, the fittings) is mounted on a tire by means of a plurality of U-shaped fittings arranged at regular intervals over the circumference of the tire tread and the linkage and the tightener that tightens the fittings inwardly. Accordingly, the tightener must be tightened with a relatively strong force when the antiskid apparatus is mounted on a tire. The fittings pose some problems such that, as the fittings are held on the tire tread by the tightening force, the tire tread would slip relative to the fittings when the tightening force is weak, resulting in a deteriorated antiskid effect, and that even when the tightening force is strong, the fittings would slide over the tire thread during braking, resulting in an extended braking distance.

In the case of the latter patent, a plurality of antiskid arms are radially extended from the central support disc. As these arms cannot be folded up, the apparatus requires a fairly large space when it is not in use and is stored in, for example, the trunk of the vehicle, and it is not convenient for carriage. Further, this antiski apparatus cannot be mounted on a tire of a vehicle wherein the upper portion of the tire is concealed within the tire housing since the anti-skid arms must be placed on the tire from the front of the tire. Moreover, the apparatus cannot be mounted on a tire without spreading a span between two consecutive gripping pieces at the top ends of said antiskid arms to the same length of the ground contact surface of the tire. As a result, the spans between gripping pieces are wide, and the actual total length of the gripping pieces arranged over the tire tread is short (less than one-half of the whole circumference of the tire), thus giving a slightly smaller antiskid effect. The apparatus also has problems in that the connecting structures between the fixed disc secured to a tire wheel, the support disc for support arms of the antiskid pieces, and the ferrule for securing the support disc onto the fixed disc are very complex and require lengthy processes of fabrication, and consequently the production costs are high.

SUMMARY OF THE INVENTION

Apparatus constructed in accordance with the present invention has numerous advantages and features, including the following: 1. It is easy to mount on or remove from a tire, and mounting and removal of the apparatus can be easily done by anyone within a short time; 2. The apparatus, when not in use, can be compactly folded up, and thus requires only a small storage space and is convenient to carry; 3. The apparatus has a high antiskid effect, and can be easily mounted on tires of a vehicle wherein a tire housing conceals the upper portions of the tire; 4. The apparatus has a simple construction and is light and allows easy handling, and the production costs are low.

To accomplish the aforementioned objectives, an antiskid apparatus according to an embodiment of the present invention is comprised of a support ring body that is removably fixed onto the tire wheel, and an antiskid apparatus proper that is mounted on the support ring body, wherein (a) the antiskid apparatus proper has a first doglegged linkage of two rods which are pivotally connected together on one end, a second doglegged linkage of two rods which are pivotally connected together on one end, the two linkages being pivotally connected in the middle of the respective rods to form a pantograph, through holes are bored at the respective middle points of the opposing rods of the linkage thereby forming a diamond shape.

a circular support member is pivotally mounted on the open end of each of the rods, a thin-plate-shaped gripping member is fixed to each of the support members, the gripping member comprising a ground contact portion that contacts the tire tread and covers at least a part of the width of the tread and a mounting portion that contacts the tire sidewall, with a roughened portion being formed at least on the exterior of the ground contact portion, and the gripping member being formed of a flexible material, a tightener is provided between the pivotally connected joints in the middle of the rods, the tightener being capable of gradually tightening between the two pivotally connected joints, (b) the support ring body is comprised of an internal ring adapted to be fixed on the tire wheel and an external ring is rotatably mounted around the internal ring, the external ring being provided with threaded holes or fitting holes that correspond to the through holes, (c) the antiskid apparatus proper is mounted on the support ring body by placing bolts or other fasteners through the through holes to screw them into the threaded holes or secure them into the fitting holes in the external ring.

In accordance with another embodiment, the apparatus according to the present invention comprises:

A first doglegged linkage of two rods pivotally connected together at one end and a second doglegged linkage of two rods pivotally connected together at one end, the linkages being pivotally connected together in the middle of the respective rods to form a pantograph, a circular support member is pivotally mounted on the open end of each of the rods, a thin-plate-shaped gripping member is fixed to each of the support members, the gripping member comprising a ground contact portion that contacts the tire tread and covers at least a part of the width of the tread and a mounting portion that contacts the tire shoulder or sidewall, with a roughened portion being formed at least on the exterior of the ground contact portion, and the gripping member being formed of a flexible material, a tightener or a holder is provided between the pivotally connected joints in the middle of said rods, the tightener being capable of gradually tightening or the holder being capable of holding between the two pivotally connected joints, through holes are formed in the rods of the linkage at points corresponding to the wheel holes that are bored in the tire wheel at intervals along the circumference thereof, the linkage is integrally mounted on the tire by means of tighteners, each of the tighteners having a hook on the top end thereof, the hook being securable in the wheel hole, and having a threaded portion in the root thereof, and the threaded portion being placed through the through hole, and a female thread member being screwed on the threaded portion to tighten the tightener.

BRIEF DESCRIPTION OF THE DRAWINGS

FIG. 3 is a right side view of the apparatus;

FIG. 4 is a sectional view along the line IV—IV of FIG. 1, showing the apparatus mounted on a tire;

DETAILED DESCRIPTION OF THE DRAWINGS

Figure 1:
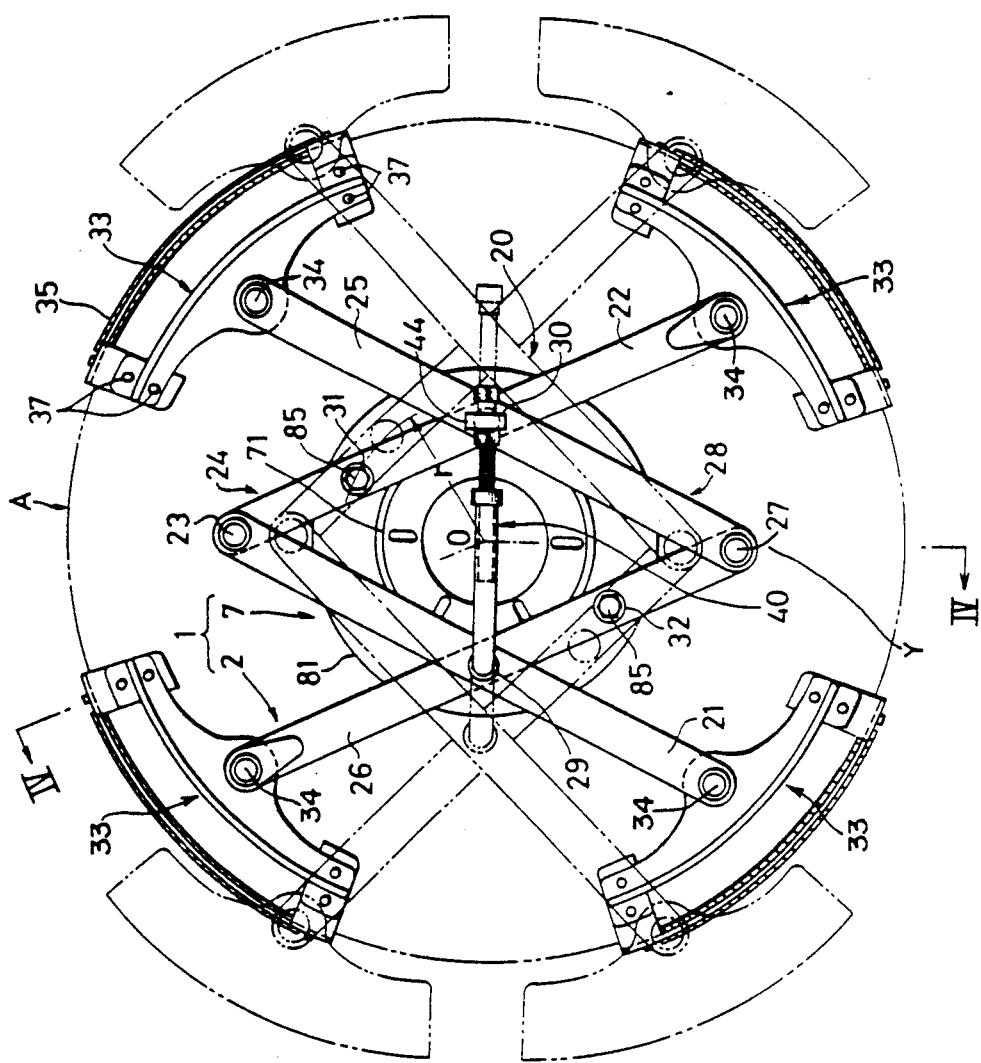
FIG. 1 is a front view showing a preferred embodiment of a tire antiskid apparatus according to the present invention.
Figure 2:
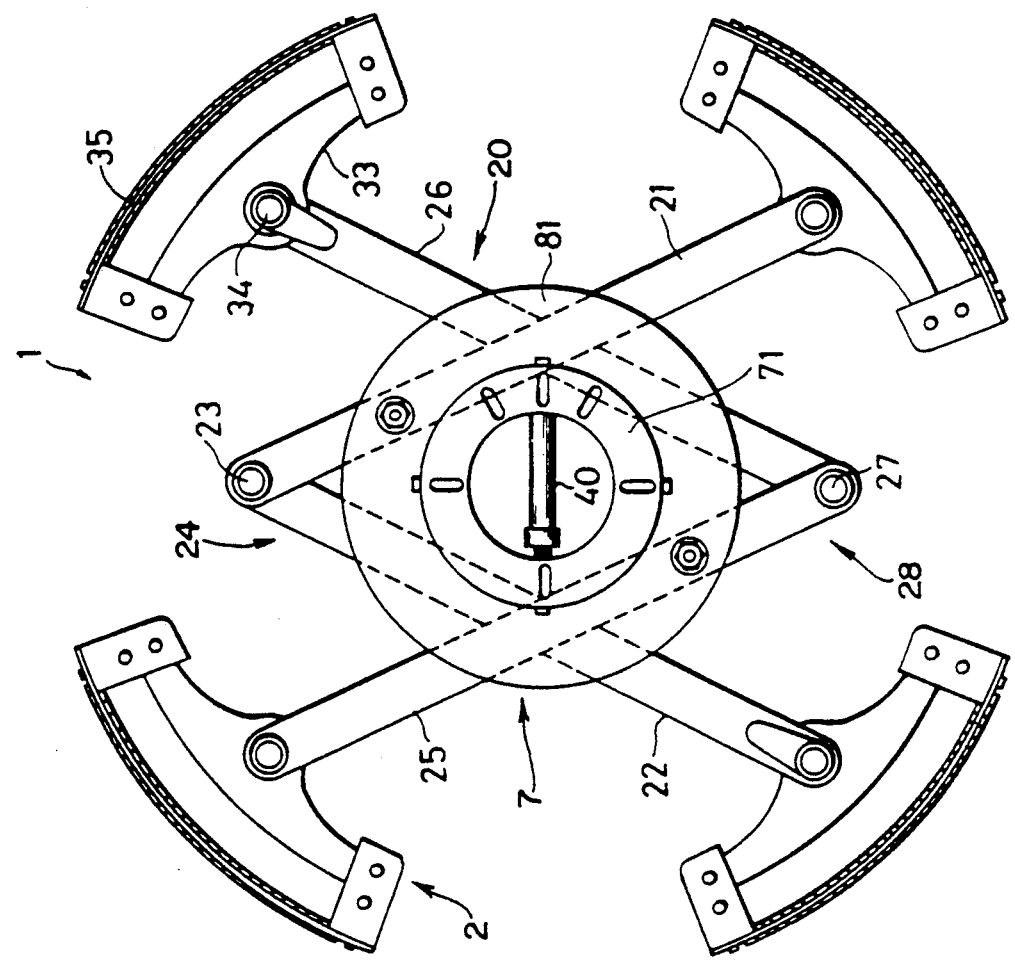
FIG. 2 is a rear view of the apparatus.

With reference to the attached drawings, in FIGS. 1 through 4, a tire A has antiskid apparatus 1 mounted thereon, which comprises an antiskid apparatus proper 2 and a support ring body 7. As shown in FIG. 1 and FIG. 2, the antiskid apparatus proper 2 has a first linkage 24 that is comprised of two rods 21 and 22 of equal length swingably pivoted at one end of a doglegged form by a pivotal pin 23, and a second linkage 28 that is comprised of two rods 25 and 26 of equal length swingably pivoted at one end in a doglegged form by a pivot pin 27. The first linkage 24 and the second linkage 28 are pivotally connected together at the middle points of the rods 21 and 22 and at the middle points of the rods 25 and 26 by means of pivot pins 29 and 30 (shown in FIG. 1) to form a pantograph 20. Through holes 31 and 32 for bolts are bored in rods 22 and 26 forming a diamond shape of the linkage 20 thus constructed at the middle points opposing each other. The positions of the through holes 31 and 32 for bolts, as clearly seen in FIG. 1, move on a circle having its center at the cross point 0 of the diagonals of the diamond and a radius r being the distance between the cross point 0 and the through holes 31 and 32 for bolts irrespective of the change in the form of the diamond shape of the linkage 20. In a specific example, the rods 21, 22, 25 and 26 are made of rigid nylon resin.

The center on the inner circumferential side of an arcuate support member 33 is pivotally connected to each outer end (free end) of the respective rods 21, 22, 25 and 26 by means of a pivot pin 34. As the support members 33 are rigidly pivoted on the outer ends of the respective rods 21, 22, 25 and 26 by the pivot pins 34, the swinging range of the support members 33 is small. The length of each support member 33 in the circumferential direction in the present embodiment, is set at about one-eighth of the overall circumference of the tire A.

As best shown in FIG. 3 and FIG. 4, a gripping member 35 shaped to be positioned over the tread B of the tire A is secured to each of the support members 33 by means of a fixture 37 (FIG. 1). The gripping member 35 is comprised of a ground contacting portion 35a that is integrally formed of a thin plate of rigid urethane resin or the like and contacts and covers about one-half of the width of the tread B, and mounting portions 35b that are extended and bent from both ends of the ground contact portion 35a and contact the shoulder or sidewall D of the tire A. Roughened or rugged surface portions 35c (FIG. 3) are formed on both internal and external surfaces of the ground contact portion 35a, and metal inserts 36 are buried in the middle and near both ends of the ground contact portion 35a, the metal inserts being aligned in the direction of the width of the tire A and partially protruding from both internal and external surfaces. The formation of the rugged portions 35c on the interior surface of the ground contact portion 35a and the partial protrusion of the metal pieces 36 from the interior surface are designed to minimize the slippage between the ground contact portions 35a and the tread B of the tire A. The partial protrusion of the metal pieces 36 from the external surface of the ground contact portion 35a is so designed that, particularly when the vehicle runs on an icy road, the protruding portions of the metal pieces 36 bite into the frozen surface to reliably prevent slippage of the tire A. Such measures, however, are not limited in any way to those mentioned above. It is sufficient, at least, to form a rugged portion 35c on the exterior of the ground contact portion 35a.

A tightener 40 is provided between the pivotal pins 29 and 30 pivotally connecting the first linkage 24 and the second linkage 28, the tightener, as shown in FIG. 1 and FIG. 2, being designed to tighten the doglegged rods 21, 22, 25 and 26 in a direction to pull them together and hold them in the tightened state. As the tightener 40, those having the constructions illustrated, for example. in FIG. 5 or in FIG. 6 and FIG. 7 are used.

Figure 5:
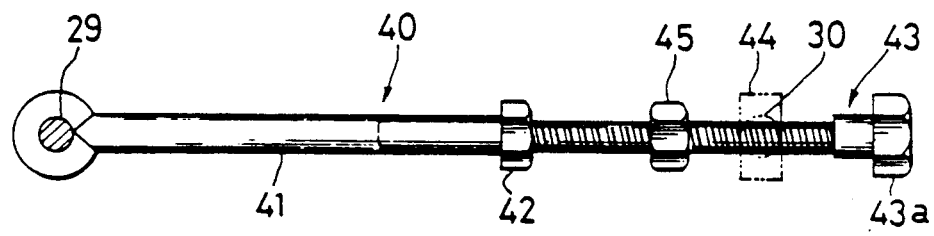
FIG. 5 is a front view of a tightener of the apparatus.

With regard first to the tightener 40 shown in FIG. 5, it is made of metal and includes a hollow tube 41, the hollow tube 41 being pivotally connected on one end to the pivot pin 29 (see also FIG. 1) for free rotation in a vertical plane and having a nut 42 fixed on the other end. The tightener 40 also has a long bolt 43 that is screwed into the nut 42, and a fitting piece 44 is fixed to the other pivotal pin 30 (FIGS. 1 and 5), the fitting piece 44 being securable to the head 43a of the bolt 43. Another nut 45 is rotatably screwed on the threaded portion 43b of the bolt 43. Accordingly, in the case of this tightener 40, when the bolt 43 is tightened, with the head 43a of the bolt 43 being secured to the fitting piece 44, the distance between the pivotal pins 29 and 30 will be gradually reduced, and the pair of linkages 24 and 28 will be pulled together and closed simultaneously. At the same time, the top end of the bolt 43 will move into the hollow tube 41. Then, if the nut 45 on the threaded portion 43b of the bolt 43 is turned to lock the nut 45 against the fitting piece 43, the specified tightening state will be maintained.

Figure 6:
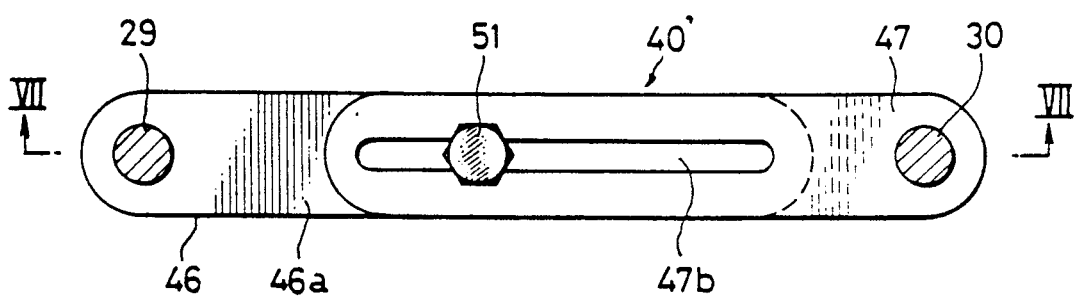
FIG. 6 is a front view of another embodiment of the tightener.
Figure 7:
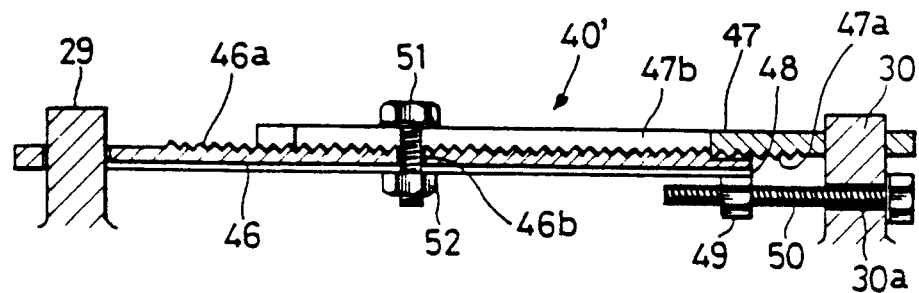
FIG. 7 is a sectional view along the line VII—VII of FIG. 6.

Next, the tightener 40', shown in FIG. 6 and FIG. 7, is made of plastics and includes a first plate member 46 having on its outer surface a large number of parallel teeth or fitting portions 46a and a second plate member 47 having on its inner surface a large number of mating teeth or fitting portions 47a, the fitting portions 47a being engageable the fitting portions 46a. The base or root end of the first plate member 46 is fixed to one pivotal pin 29, and the base or root end of the second plate member 47 is fixed to the other pivotal pin 30. A nut 49 is fixed to the top end of the first plate member 46 by means of a support piece 48 which is partly embedded in the plate member 46, and a long bolt 50 that can be screwed into the nut 49 is mounted through a loose through hole 30a horizontally bored in the pivotal pin 30, the bolt 50 being screwed into the nut 49. A slot 47b is formed in the second plate member 47 in the longitudinal direction thereof, and a through hole 46b is formed in the first plate member 46 approximately in the middle. A fixing bolt 51 for securing the parts together is loosely placed through the slit 47b and the through hole 46b, and a nut 52 is screwed on the bolt 51. In the case of this tightener 40', when the bolt 50 is turned for tightening the assembly, with the fixing bolt 51 being loose, the distance between the pivotal pins 29 and 30 will be gradually reduced, and the pair of linkages 24 and 28 will be closed simultaneously. If the fixing bolt 51 is then tightened, the specified tightening state will be maintained.

Figure 8:
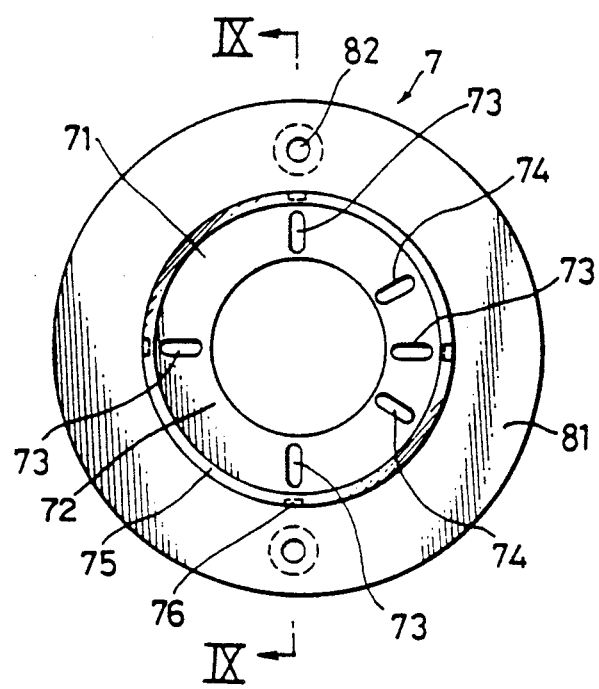
FIG. 8 is a front view of a support ring of the apparatus.
Figure 9:
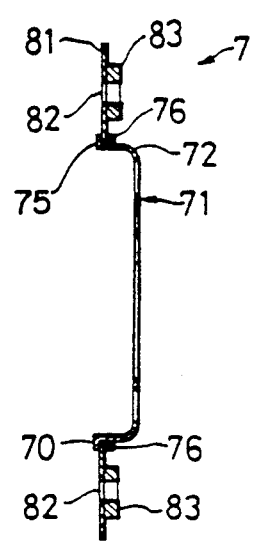
FIG. 9 is a sectional view along the line IX—IX of FIG. 8.

As shown in FIG. 8 and FIG. 9, the support ring body 7 is composed of an internal ring 71 designed to be fixed on the wheel C of the tire A, and an external ring 81 rotatably mounted on and around the inner ring portion 71.

The internal ring 71 has a circular dish-shaped convex surface 72 with an opening at the center, and four slits 73 are bored in the convex surface 72, the slits 73 extending radially at regular intervals in the circumferential direction. Furthermore, on both sides of one slit 73, two additional slits 74 are formed at an angle of 36 degrees away from the slit 73 in the circumferential direction, the slits 74 also extending radially. The provision of such six slits 73 and 74 is to assure general applicability of the support ring body 7 to vehicles of different sizes and/or different numbers (four or five) of the threaded members E for mounting of the tire A (see FIG. 4).

The internal circumference of the external ring 81 is set on the flange 75 of the internal ring 71, and the external ring 81 is rotatably mounted on the internal ring 71 by means of the fittings 76 fixed to the circumferential side of the internal ring 71, the internal circumference of the external ring 81 being held between the fittings 76 and the flange 75. The external ring 81 is provided with a pair of opposing threaded holes 82 corresponding to the through holes 31 and 32 for bolts 85. In the present embodiment, each threaded hole 82 is formed by a nut 83 fixed to the external ring 81. The internal ring. 71 and the external ring 81 are normally made of metal.

Next, the use and function of the aforementioned embodiment of the tire antiskid apparatus is as follows:

As shown in FIG. 4, the internal ring 71 of the support ring body 7 is mounted beforehand on the wheel C of the tire A by placing bolts F through the slots 73 and screwing bolts F in the threaded holes for the wheel screws E. In this state, normal running operation of the vehicle is possible. When, for example, snow is on the ground 5 and the antiskid apparatus is required, the antiskid apparatus may be mounted on the tire A by mounting the antiskid apparatus proper 2 on the external ring 81 of the support ring body 7. In the mounting operation, in the case of the tightener 40 shown in FIG. 5, for example, the bolt 43 together with the hollow tube 41 is turned downwardly to release the bolt 43 from its engagement with the fitting piece 44 and the pantograph 20 is expanded. In this state, bolts 85 are placed through the through holes 31 and 32 for bolts in the rods 22 and 26 and screwed into the threaded holes 82 and 83 of the external ring 81 of the support ring body 7 in order to mount the antiskid apparatus proper 2 on the support ring 7. Then, the bolt 43 together with the hollow tube 41 is turned towards the fitting piece 44 to secure the bolt 43 to the fitting piece 44, and the bolt 43 is tightened to gradually reduce the distance between the pivotally connected joints 29 and 30 in the middle of the rods 21, 22, 25 and 26. As a result, the doglegged first linkage 24 and second linkage 28 will be pulled together simultaneously with the pivotal pins 23 and 27 as the centers of movement, and the ground contact portion 35a of each thin-plate-shaped gripping member 35 will be moved upwardly or downwardly to be brought to contact with and then forced against the tread B of the tire A, and the antiskid apparatus proper 2 will thus be mounted on the tire.

The mounting of the antiskid apparatus proper 2 on the support ring body 7 may be made after tentatively mounting the antiskid apparatus proper 2 on the tire A according to the aforementioned procedure. When the antiskid apparatus 1 is to be mounted on the tire A, with the support ring body 7 not previously being mounted on the wheel C of the tire A, the antiskid apparatus proper 2 may be mounted on the support ring body 7 first. Then the antiskid apparatus proper 2 is mounted on the tire A according to the aforementioned procedure, and the support ring body 7 is mounted on the wheel C of the tire A.

On the other hand, to remove the antiskid apparatus proper 2 from the tire A after use, the bolts 85 screwed into the threaded holes 82 of the external ring 81 of the support ring body 7 are loosened and removed from the through holes 31 and 32 of the antiskid apparatus proper 2. Since the upper portion of the antiskid apparatus proper 2 will tilt away from the front of the tire A, it will be sufficient to give the tire A from one-half to one turn. The antiskid apparatus proper 2 will automatically come off the tire A.

Figure 10:
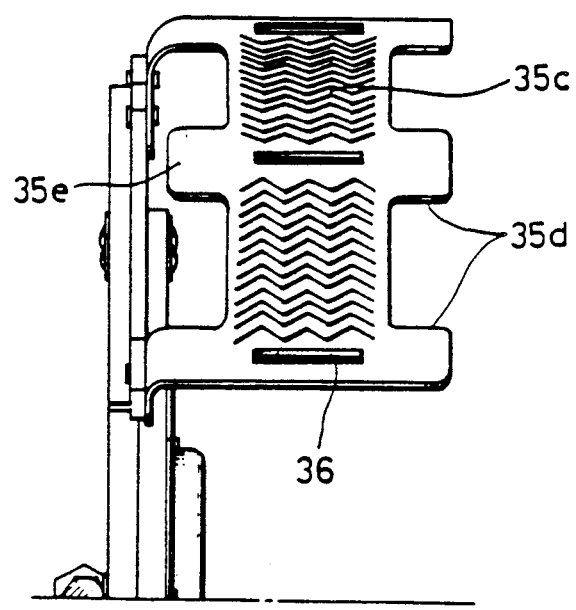
FIG. 10 is a partial side view similar to FIG. 3 but showing a second embodiment of the tire antiskid apparatus according to the present invention.

FIG. 10 illustrates the second embodiment of the antiskid apparatus according to the present invention. In this embodiment, gripping pieces 35d are extended from the inner edge (on the right-hand side in the figure) of the gripping member 35 in the direction of the width of the tread B, the gripping pieces 35d being spaced from each other. Furthermore, a gripping piece 35e is also extended on the outer edge (on the left-hand side of the figure) of the gripping member 35. This arrangement improves the antiskid effect in particular when the ground is covered with snow.

Figure 11:
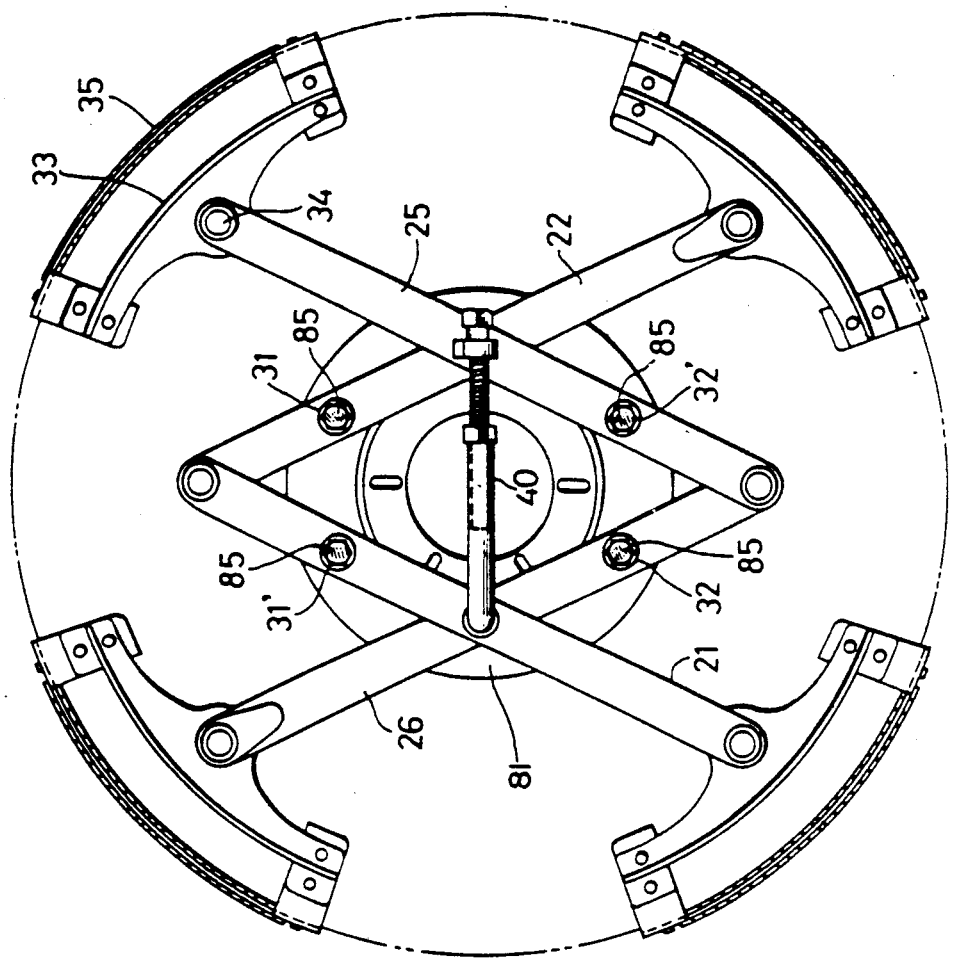
FIG. 11 is a front view similar to FIG. 1 but showing a third embodiment of the tire antiskid apparatus according to the present invention.

FIG. 11 shows the third embodiment of the antiskid apparatus according to the present invention. In this embodiment, a total of four through holes 31, 32, 31' and 32' for bolts are provided in the middle of the rods 21, 22, 25 and 26 forming a diamond shape, and threaded holes 82 for bolts 85 are also provided at four points in the external ring 81 of the support ring body 7, said four points being aligned with the through holes 31, 32, 31' and 32'. The antiskid apparatus proper 2 is first mounted on the tire A tentatively, then the antiskid apparatus proper 2 is clamped down by screwing the four bolts 85. Accordingly, in the present embodiment, the fixing nut 45 for the tightener 40 is not required. Moreover, during the running of the vehicle, with the antiskid apparatus 1 being mounted on the tire A, almost no forces will act on the tightener 40. Hence the tightener 40 requires a strength just sufficient for the tightening application, and the tightener thus can be reduced in size and weight to that extent.

Figure 12:
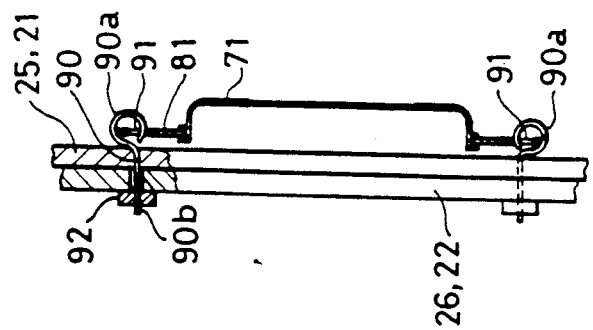
FIG. 12 is a sectional view similar to FIG. 9 but showing a fourth embodiment of the present invention.

FIG. 12 illustrates the fourth embodiment of the antiskid apparatus according to the present invention. In this embodiment, the antiskid apparatus proper 2 is mounted on the support ring body 7 by means of fixtures 90 in place of bolts 85. Accordingly, fitting holes 91 rather than threaded holes 82 are formed in the external ring 81 of the support ring body 7. The top end of the fixture 90 is formed into a hook 90a, and a threaded portion 90b is formed in the root end of the fixture 90. The arrangement is such that the hooks 90a of the fixtures 90 are secured to the fitting holes 91, and the threaded portions 90b of the fixtures 90 are placed in the through holes 31 and 32 of the rods 22 and 26, respectively, and nuts 92 are screwed on the threaded portions 90b to tighten them.

Figure 13:
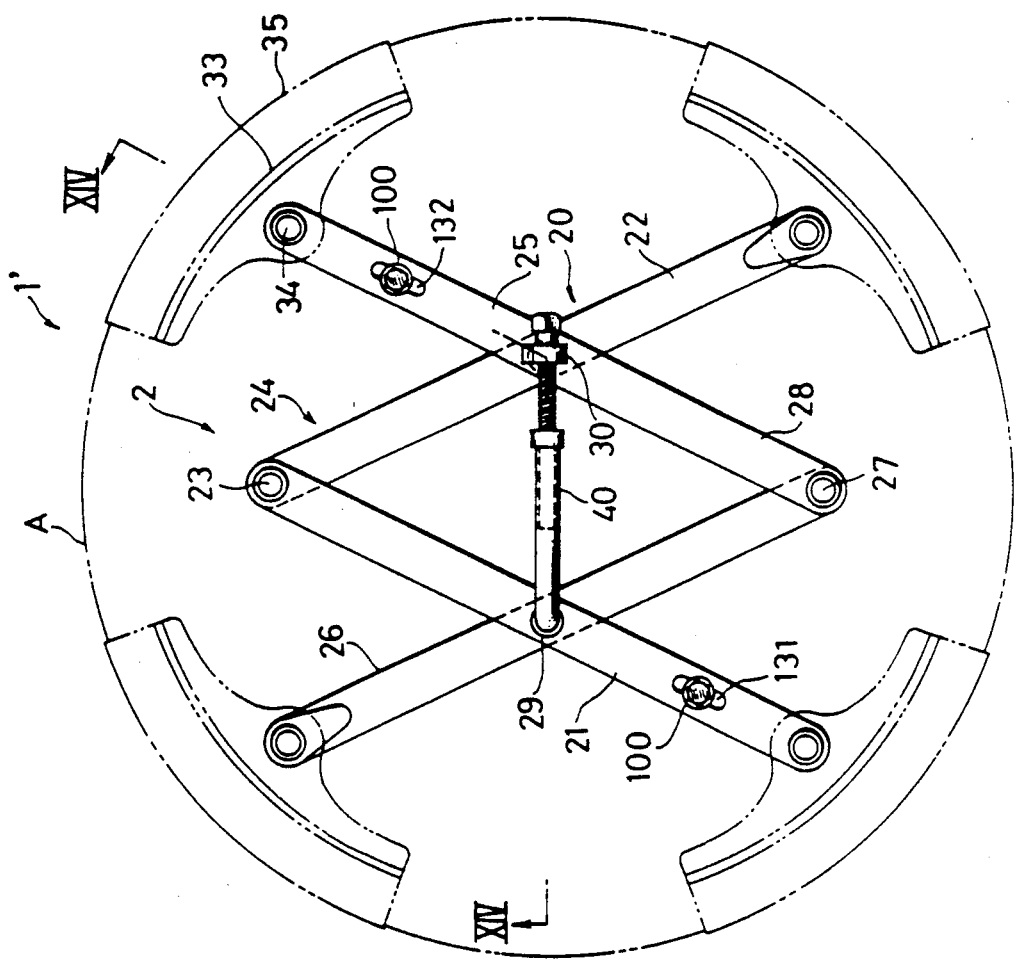
FIG. 13 is a front view of the antiskid apparatus according to another embodiment.
Figure 14:
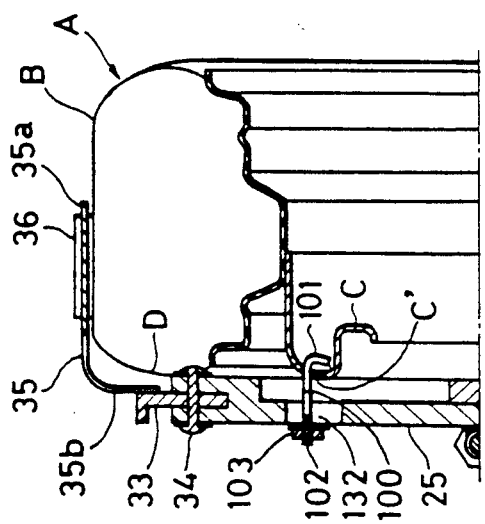
FIG. 14 is a sectional view along the line XIV—XIV of FIG. 13.

FIG. 13 and FIG. 14 illustrate a tire antiskid apparatus according to another embodiment. The antiskid apparatus 1' according to this embodiment differs from that according to the aforementioned embodiments in that the antiskid apparatus proper 2 is designed to be secured directly to the wheel C of the tire A by means of fixtures 100, without using the support ring body 7 according to the aforementioned embodiments. The rods 21 and 25 of the linkage 20 are provided with through slots 131 and 132, respectively, at positions corresponding to a plurality of wheel holes C' normally provided in the wheel C for a tire A at intervals in the circumferential direction. The hooked fixture 100 has a hook 101 on the top end and a threaded portion 102 at the root end thereof, the hook 101 being securable in the wheel hole C'. The threaded portions 102 of the fixtures 100 are placed through the through holes 131 and 132, and nuts 103 as female thread members are screwed on the threaded portions 102. Accordingly, in contrast with the apparatus according to earlier embodiments, the support ring body 7 is not required, and the construction is simpler. Furthermore, in the apparatus 1' according to the present embodiment, the antiskid apparatus proper 2 is integrally fixed to the tire A. Hence the gripping members 35 always rotate integrally with the tread B of the tire A. Other constituent parts are the same or similar to those of the apparatus 1 according to the earlier embodiments. Hence common members are indicated in the drawings with the same reference numbers and symbols used in FIG. 1, and a detailed explanation is unnecessary.

Figure 15:
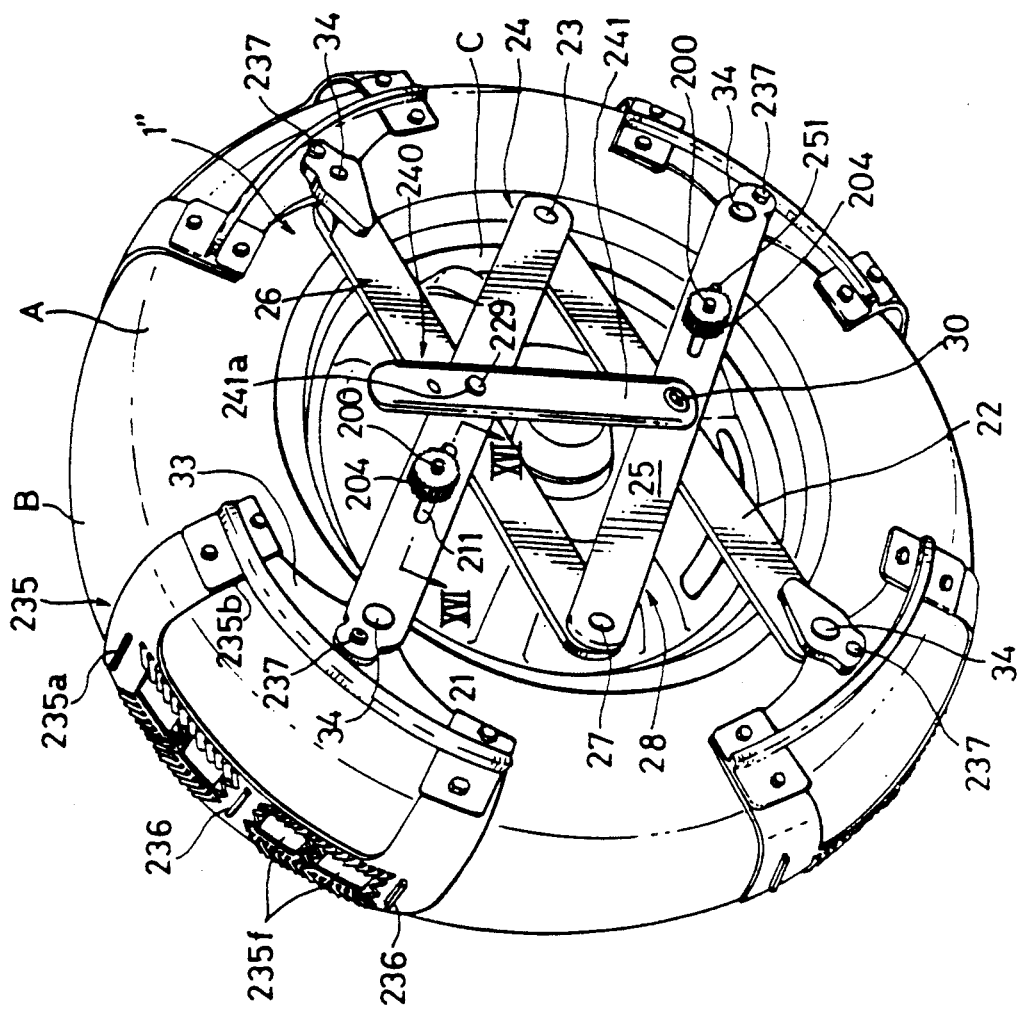
FIG. 15 is a perspective view showing the antiskid apparatus according to still another embodiment.
Figure 16:
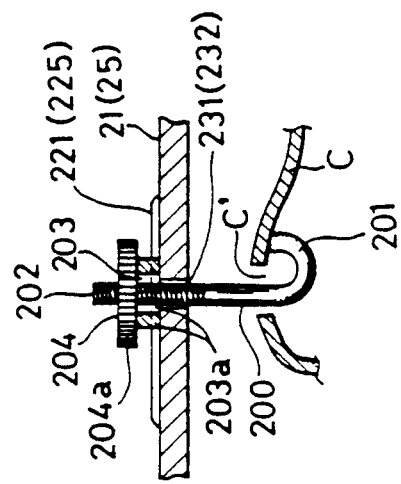
FIG. 16 is a sectional view along the line XVI—XVI of FIG. 15.

FIG. 15 and FIG. 16 show a tire antiskid apparatus according to still another embodiment.

The antiskid apparatus 1" according to this embodiment, like that according to the embodiment of FIGS. 13 and 14, differs from the earlier embodiments in that the antiskid apparatus proper 2 is secured directly to the wheel C of the tire A by means of fixtures 200, without using the support ring body 7. The rods 21 and 25 of the linkage 20 are provided with through holes 231 and 232, respectively, at positions corresponding to a plurality of wheel holes C' normally provided in the wheel C of the tire A at spaced intervals in the circumferential direction. The J-shaped fixture 200 has a hook 201 on the top end and a threaded portion 202 at the root end thereof, the hook 201 being securable in the wheel hole C'. The threaded portions 202 of the fixtures 200 are placed through the through holes 231 and 232, and nuts 203, as female thread members, are screwed on the threaded portions 202. The rods 21 and 25 are provided with raised ribs 221 and 225 in the middle in the longitudinal direction thereof. Fitting grooves 203a that mate with these ribs 221 and 225 are formed in the nuts 203 and the disc 204, that will be explained later, so that when the nuts 203 are tightened the fitting grooves 203a mate with the rib 221 or 225 to prevent nuts 203 from working loose. Furthermore, the nut 203 is embedded in a plastic disc 204 having a large diameter so that the nut 203 can be turned without using any tools such as a wrench. Grooves 204a are formed in the outer side circumference of the disc 204 to prevent slippage.

In the apparatus 1" according to the present invention, similar to the apparatus 1', the antiskid apparatus proper 2 is integrally secured to the tire A by means of fixtures 200. Hence there is no need for pressing the gripping members 235 against the tread B of the tire A. Accordingly, a holder 240 is provided in place of the tightener 40. In other words, a holder 240 is provided between the pivot pins 29 and 30, the pivot pins 29 and 30 pivotally connecting the first linkage 24 and the second linkage 28, and the holder 240 holding both pivot pins 29 and 30 at a constant distance from each other according to the outer diameter of the tire A. This holder 240, in the present embodiment, has a construction such that one end of a plastic bar or plate 241 is rotatably connected by the pivot pin 30 pivotally connecting the rods 22 and 25 in the middle, a fitting pin 229 is integrally and protrusively provided on the pivotal pin 29 pivotally connecting the rods 21 and 26, and a fitting hole 241a which is securable to the fitting pin 229 is opened in the other end of the plate 241. Furthermore, since the described construction holds the apparatus proper 2 in a constant form relative to the outer diameter of the tire A, in contrast with the apparatuses 1 and 1' of the aforementioned embodiments, there is no need for swinging the circular support members 33 to match them to the size of the tire A. Hence the support members 33 are pivotally mounted on the open ends of the respective rods 21, 22, 25 and 26 by means of pivot pins 34, and the positions of the support members 235 relative to the open ends of the respective rods 21, 22, 25 and 26 are determined so that the ground contact portions 235a of the gripping members 235 mounted on the support members 33 are aligned over the tread B of the tire A, and the support members 235 are secured by fixing pins 237 to control swinging of the support members 235.

The gripping members 235 are provided, as shown in FIG. 15, with a plurality of openings 235f formed at intervals in the ground contact portions 235a. Provision of such openings 235f produces gripping effects along the edges of the respective openings 235f (in particular, along the edges in the direction of the width of the tread B of the tire A). Furthermore, because snow or the like penetrated into the gap between the tread B and the gripping members 235 will be quickly discharged from the openings 235f, snow or the like will not stay in the gap between the tread B and the gripping members 235. As a result, the gripping effect of the gripping members 235 is improved considerably relative to the aforementioned gripping members 35. In common with the aforementioned embodiment, metal pieces 236 are embedded in the gripping members 235, the metal pieces partially protruding from both inner and outer surfaces.

Most other constituent parts are similar or the same as those of the apparatus 1 and or the apparatus 1' according to the aforementioned embodiments. Hence common members are indicated in the drawings with the same symbols used in FIG. 1, and detailed explanation is unnecessary.

The simplest method for mounting the apparatus 1" shown in FIGS. 15 and 16 on the tire A is as follows. First, the pivotal joints 29 and 30 in the middle of the respective rods 21 and 26, and 22 and 25 are kept at a specified distance by means of the holder 240 to hold the linkage 20 in a specified form. Then the gripping members 235 are placed on the tread B of the tire A, and the linkage 20 is placed on the wheel C. Thus the apparatus 1" is tentatively mounted on the tire A. It should be noted that, when the gripping members 235 are placed on the gripping surface B, the gripping members 235 will be bent and deformed to some extent because of their flexibility. It, therefore, is easy to tentatively mount the apparatus 1" even when the form of the linkage 20 is kept unchanged. Next, the hook 201 of each fixture 200 is secured in the wheel hole C', and the nut 203 is tightened via the disc 204 to integrally mount the antiskid apparatus 1" on the tire A. When the nut 203 is tightened, the fitting groove 203a thereof is mated with the rib 221 or 225. As the fixture 200 is J-shaped, the hook 201 may be secured in a wheel hole C' which is a little away from the correct position corresponding to the through hole 231 or 232 of the rod 21 or 25 by turning the fixture 200 to change the direction of the hook 201.

Although illustration is omitted, in the case of a tire A of which the wheel C has no wheel holes C' or of which the wheel C has wheel holes C' in which the hooks 201 cannot be secured, the linkage 20 may be fixed in the following manner. The external ring 81 of the support ring body 7 (FIG. 8 and FIG. 9) is formed integral with the internal ring 71; in other words, the external ring 81 is fixed to prevent its rotation. Through holes are opened in the linkage 20 in the same positions as the through bolt holes 31 and 32 (FIG. 1), and the linkage 20 is fixed by screwing bolts 85 (FIG. 1) into the threaded holes 82 of the external ring 81.

The following is a summary of the use and operation of the invention.

In the case of the first described antiskid apparatus, the support ring body is mounted on a tire wheel beforehand, and the antiskid apparatus proper is mounted on the support ring body by loosening the tightener and expanding the pantograph then putting bolts through the respective through holes and threading the bolts into the threaded holes in the external ring of said support ring, or putting the fixtures secured in the fitting holes in the external ring through the through holes to fix the fixtures. Then, the tightener is tightened to gradually reduce the distance between the pivotally connected joints in the middle of the rods and force the ground contact portions of the respective thin-plate gripping members against the tire tread and in turn to tentatively mount the antiskid apparatus proper on the tire. Since the positions of the respective opposing through holes of the rods forming the diamond shape of the linkage always stay on a circle with the center being the cross point of the diagonals of the diamond irrespective of the change in the shape of the diamond of the linkage, in other words, irrespective of the change in the distance between the pivotally connected joints in the middle of the rods, the positions of the threaded holes or fitting holes in the external ring of the support ring body and the positions of the through holes never deviate in a radial direction. Hence the mounting of the antiskid apparatus proper on the support ring body may be made last.

With the antiskid apparatus being mounted on the tire as mentioned above, when the tire is turned, the antiskid apparatus will turn virtually integrally with the tire. As the tire turns, each time that the ground contact portion of a gripping member contacts the ground, the support member will swing a little with the pivot point as the center of swing and allow the interior of the gripping member to lie along the tread of the tire. The tire will turn, with a plurality of gripping members lying over the tread thereof, the tread and the exterior surfaces of the ground contact portions of the gripping members will alternatively contact the ground, and the roughened portions on the exterior of the ground contact portions and the edge portions of the gripping members will bite into the snow or frozen surface to securely grip the ground. Furthermore, when the vehicle is stopped suddenly or started suddenly, the antiskid apparatus proper will rotate, relative to the tire, together with the external ring of the support ring body; in other words, the gripping members will slide over the tread of the tire. As a result, no excessive forces will be applied to the apparatus proper including the bolts or fixtures for mounting the apparatus proper on the external ring of the support ring body. The ground contact portion of the tire will be deformed virtually flat. Since the gripping members have a flexibility, the gripping members will be deformed to match the deformation of the tire. As a result, skidding of the tire is reliably prevented, and even when the vehicle travels over a road free of snow or ice, running noise and vibration are small.

After use, to remove the antiskid apparatus proper, one first loosens the bolts screwed into the threaded holes or fixtures secured in the fitting holes in the external ring of the support ring body and removes the bolts or fixtures from the through holes in the antiskid apparatus proper. Then the tire is turned by from one-half to one turn. The antiskid apparatus proper will then come off the tire. Next, one tightens the antiskid apparatus proper to fold it, and store it in, for example, the trunk of the vehicle.

In the case of another embodiment of the antiskid apparatus, gripping members are placed over the tread of the tire, and the linkage is placed along the wheel. Then the linkage is tightened by means of the tightener to gradually reduce the distance between the pivotally connected joints in the middle of the rods and force the ground contact portions of the respective thin-plate-shaped gripping members against the tire tread. In this way, the antiskid apparatus is tentatively mounted on the tire. Then, the hooks of the tightener are secured in the holes in the wheel, and the female thread members are screwed on the threaded portions at the root end of the tighteners to mount the antiskid apparatus on the tire. The tire is turned under this condition. The gripping members will not slide over the tire tread under normal running conditions, even when the vehicle is stopped or started suddenly. Since the antiskid apparatus always turns integrally with the tire, the apparatus has a very high antiskid effect, and the braking distance is short.

In the case of the next embodiment of the antiskid apparatus, after or before the gripping members are arranged over the tread of the tire and the linkage is placed along the wheel, the pivotally connected joints in the middle of the rods are kept at a specified distance by means of the holder to fix the linkage in a specified form and tentatively mount the linkage on a tire. Then the hooks of the tighteners are secured in the holes in the wheel and the female thread members screwed on the threaded portions in the root ends of the tighteners are tightened to integrally mount the antiskid apparatus on the tire. The tire is turned under this condition. The gripping members will not slide over the tire tread under normal running conditions, even when the vehicle is stopped or started suddenly. Since the antiskid apparatus always turns integrally with the tire, the apparatus has a very high antiskid effect, and the braking distance is short.

In the case of the next embodiment of the antiskid apparatus, the exterior side projections of the metal pieces buried in the gripping members bite into the ground to grip it, and the rugged portions also grip the ground. Accordingly, the antiskid apparatus will reliably prevent slippage of the tire even on the icy road. Since the metal pieces projecting from the rear surface of the gripping members are forced against the tread of the tire, the gripping members hardly slip over the tire tread during braking. Furthermore, plastics such as urethane resin have excellent flexibility, and the gripping members, in particular the ground contact portions thereof, will quickly respond to the deformation of the tire (tread) to deform themselves and not leave from the tread surface.

As will be clear from the explanation above, the tire antiskid apparatus according to the present invention has the following advantages or effects:

(1) It is easy to mount on and remove from a tire. Skill is not required, and fitting and removal of the apparatus can be made even by female drivers with ease, and in a short time (several tens of seconds). During the installation of the apparatus on the tire, each gripping member will shift from a level around the middle of the tire upwardly or downwardly along the tread, and the gripping members will be arranged around the tread nearly at regular intervals. Thus the apparatus can be easily mounted on tires of a vehicle with tire houses in which the upper portion of the tire is concealed. Furthermore, when the apparatus is not in use, the apparatus can be compactly folded up and stored in the trunk of a vehicle. Thus it is convenient to store and carry.

(2) The construction is simple, and the major components can be made of plastics for lightweight and excellent appearance.

The gripping members arranged over the tread of the tire rotate together with the tire. Furthermore, the gripping members will be deformed to match with the deformation of the ground contact portion of the tire. Thus the gripping members will turn with the tire, always lying along the tread. Accordingly, the apparatus has a high antiskid effect. Even when the vehicle runs on a road free of snow, the running noise and vibration are almost nil.

(3) When a force is suddenly applied to the tire, such as when the vehicle is stopped or started suddenly, the tire will slip relative to the antiskid apparatus proper, and no excessive force will be applied to the bolts or fixtures for mounting the apparatus proper on the external ring of the support ring body nor the apparatus proper, thus the apparatus proper will be protected. Accordingly, the apparatus can be used with stable and reliable performance over a long period.

(4) The antiskid apparatus described and claimed herein have the effects of paragraphs (1) and (2) above, as well as the effects that the constructions are simple and the apparatus can be produced inexpensively, that as the gripping members always rotate integrally with the tire, the antiskid effect is very high and the braking distance is shorter. Furthermore, even when the vehicle runs on a road free of snow, the running noise and vibration are almost nil.

(5) At least some of the antiskid apparatus described herein can be installed by first holding the apparatus proper in a specified form by means of the holder, fitting the gripping members on the tire, and fixing the apparatus with the fixtures. Thus the mounting on and removal from the tire can be more easily accomplished and in a shorter time. Moreover, with the provision of a holder in place of a tightener, the construction is simpler and the durability is improved.

(6) Further, the antiskid apparatus reliably prevents the tire from skidding even on an icy road. Furthermore, as the rear surfaces of the gripping members are forced against the tread of the tire, the gripping members will not slip over the tread of the tire during, for example, braking. Since the gripping members have an excellent flexibility, the gripping members, in particular, the ground contact portions thereof, will be deformed quickly in response to the deformation of the tire, and will not leave the tread. Thus the antiskid effect is very high.

What is claimed is:

1. An antiskid apparatus for a tire mounted on a tire wheel, said apparatus comprising a support ring body that is removably fixed onto the tire wheel, and an antiskid apparatus proper that is mounted on the support ring body, wherein:

(a) said antiskid apparatus proper comprises a first doglegged linkage of two rods pivotally connected together on one end, a second doglegged linkage of two rods pivotally connected together on one end, said two linkages being pivotally connected in the middle of the respective rods to form a pantograph, said rods have through holes bored at the respective middle points of said rods of said linkage thereby forming a diamond shape, an arcuate support member is pivotally mounted on the outer ends of said rods, a thin-plate-shaped gripping member is fixed to each of said support members, said gripping member comprising a ground contact portion that is adapted to contact the tire tread and cover at least a part of the width of the tread and a mounting portion that is adapted to contact the tire sidewall, with a roughened portion being formed at least on the exterior of said ground contact portion, and said gripping member being formed of a flexible material, a tightener is provided between the pivotal connections in the middle of said rods, said tightener being capable of gradually tightening between said pivotal connections, (b) said support ring body is comprised of an internal ring adapted to be fixed on the tire wheel and an external ring rotatably mounted around said internal ring, said external ring being provided with threaded holes or fitting holes that correspond to said through holes, and (c) said antiskid apparatus proper is mounted on said support ring body by fasteners in said through holes to screw the bolts into the threaded holes or secure the fixtures into the fitting holes in the external ring.

2. An antiskid apparatus for a tire mounted on a tire wheel which has wheel holes therein, said apparatus comprising a first doglegged linkage of two rods pivotally connected together on one end and a second doglegged linkage of two rods pivotally connected together at one end, said linkages being pivotally connected together at one end, said linkages being pivotally connected together in the middle of the respective rods to form pantograph, an arcuate support member pivotally mounted on the outer end of each of said rods, a thin-plate-shaped gripping member fixed to each of said support members, said gripping member comprising a ground contact portion that is adapted to contact the tire tread and cover at least a part of the width of the tread and a mounting portion that is adapted to contact the tire sidewall, with a roughened portion being formed at least on the exterior of said ground contact portion, and said gripping member being formed of a flexible material, a tightener provided between the pivotally connected joints in the middle of said rods, said tightener being capable of gradually tightening between said two pivotal connections, through holes bored in said rods of said linkage at points corresponding to said wheel holes that are formed in said tire wheel at intervals along the circumference thereof, said linkage being adapted to be mounted on the tire wheel by means of tighteners, each of said tighteners having a hook on a first end thereof, said hook being securable in said wheel hole and having a threaded portion in a second end thereof, and said threaded portion being positioned through one of said through holes, and a female thread member being screwed on said threaded portion to tighten the tightener.

3. An antiskid apparatus for a tire mounted on a tire wheel which has wheel holes therein, said apparatus comprising a first doglegged linkage of two rods pivotally connected together on one end and a second doglegged linkage of two rods pivotally connected together at one end, said linkages being pivotally connected together in the middle of the respective rods to form a pantograph, an arcuate support member pivotally mounted on the outer end of each of said rods, a thin-plate-shaped gripping member fixed to each of said support members, said gripping member comprising a ground contact portion that is adapted to contact the tire tread and cover at least a part of the width of the tread and a mounting portion that is adapted to contact the tire sidewall, with a roughened portion being formed at least on the exterior of said ground contact portion, and said gripping member being formed of a flexible material, a holder provided between the pivotally connected joints in the middle of said rods, said holder being capable of holding both pivotal connections at a specified distance from each other, through holes bored in the rods of said linkage at points corresponding to said wheel holes that are formed in said tire wheel at intervals along the circumference thereof, said linkage being adapted to be mounted on the tire wheel by means of tighteners, each of said tighteners having a hook on a first end thereof, said hook being securable in said wheel hole and having a threaded portion in a second end thereof, and said threaded portion being positioned through one of said through holes, and a female thread member being screwed on said threaded portion to tightened the tightener.

4. A tire antiskid apparatus described in any of the claims 1 through 3, wherein said gripping member comprises a plurality of metal pieces embedded in a flexible thin plate made of plastic, said metal pieces extending in the direction of the tire width and protruding from both the inner and exterior surfaces of said thin plate and being arranged in the circumferential direction at spaced intervals.

* * * * *